(12) United States Patent
Noguchi et al.

(10) Patent No.: US 8,846,197 B2
(45) Date of Patent: Sep. 30, 2014

(54) IMPACT-ABSORBING PRESSURE-SENSITIVE ADHESIVE SHEET AND METHOD OF PRODUCING THE SAME

(75) Inventors: Tomonori Noguchi, Osaka (JP); Atsushi Hino, Osaka (JP); Kanji Nishida, Osaka (JP); Kazuo Kitada, Osaka (JP); Takaichi Amano, Osaka (JP)

(73) Assignee: Nitto Denko Corporation, Ibaraki-shi (JP)

( * ) Notice: Subject to any disclaimer, the term of this patent is extended or adjusted under 35 U.S.C. 154(b) by 952 days.

(21) Appl. No.: 11/833,002

(22) Filed: Aug. 2, 2007

(65) Prior Publication Data

US 2008/0050584 A1 Feb. 28, 2008

(30) Foreign Application Priority Data

Aug. 3, 2006 (JP) ................................. 2006-211662

(51) Int. Cl.
| B32B 7/12 | (2006.01) |
| B05D 5/10 | (2006.01) |
| C09J 7/02 | (2006.01) |
| C09J 9/00 | (2006.01) |

(52) U.S. Cl.
CPC ... B32B 7/12 (2013.01); C09J 7/02 (2013.01); C09J 9/00 (2013.01)
USPC ......................................... 428/343; 428/40.1

(58) Field of Classification Search
None
See application file for complete search history.

(56) References Cited

U.S. PATENT DOCUMENTS

| 6,731,367 B1 * | 5/2004 | Saitoh ........................... 349/158 |
| 7,208,206 B2 | 4/2007 | Hieda et al. |
| 7,718,257 B2 | 5/2010 | Murata et al. |
| 2003/0178124 A1 * | 9/2003 | Mikami et al. ................... 156/87 |
| 2004/0038020 A1 | 2/2004 | Murata et al. |
| 2004/0180148 A1 | 9/2004 | Hieda et al. |
| 2006/0108050 A1 | 5/2006 | Satake et al. |
| 2007/0224416 A1 | 9/2007 | Matsubayashi et al. |

FOREIGN PATENT DOCUMENTS

| CN | 1473184 A | 2/2004 |
| CN | 1538223 A | 10/2004 |
| JP | 9-241589 A | 9/1997 |
| JP | 2001-266759 A | 9/2001 |
| JP | 2001-316647 A | 11/2001 |
| JP | 2004-170907 A | 6/2004 |
| JP | 2005-173462 A | 6/2005 |
| JP | 2005-189530 A | 7/2005 |
| JP | 2005-336249 A | 12/2005 |
| JP | 2006-322964 A | 11/2006 |
| WO | 97/33946 A | 9/1997 |

OTHER PUBLICATIONS

Tatsuaki, Kuji, JP 2006-322964 (Machine Translation).*

(Continued)

*Primary Examiner* — Callie Shosho
*Assistant Examiner* — Cheng Huang
(74) *Attorney, Agent, or Firm* — Westerman, Hattori, Daniels & Adrian, LLP

(57) ABSTRACT

An impact-absorbing pressure-sensitive adhesive sheet according to an embodiment of the present invention includes an impact-absorbing pressure-sensitive adhesive layer including an impact-absorbing layer. A side surface of the impact-absorbing pressure-sensitive adhesive layer includes a tapered surface; and the tapered surface has a taper angle of 65° or more.

7 Claims, 2 Drawing Sheets

(56) References Cited

OTHER PUBLICATIONS

Chinese Office Action dated May 18, 2010, issued in corresponding Chinese Patent Application No. 200710143724.1.

Japanese Office Action dated Nov. 2, 2011, issued in corresponding Japanese Patent Application No. 2006-211662.
Japanes Office Actio dated Apr. 16, 2014, issued in corresponding Japanese Patent Application No. 2012-275681, w/ English translation (6 pages).

* cited by examiner

IMPACT-ABSORBING PRESSURE-SENSITIVE ADHESIVE SHEET AND METHOD OF PRODUCING THE SAME

This application claims priority under 35 U.S.C. Section 119 to Japanese Patent Application No. 2006-211662 filed on Aug. 3, 2006, which is herein incorporated by reference.

BACKGROUND OF THE INVENTION

1. Field of the Invention

The present invention relates to an impact-absorbing pressure-sensitive adhesive sheet and to a method of producing the same. More specifically, the present invention relates to an impact-absorbing pressure-sensitive adhesive sheet to be used for an image display apparatus such as a liquid crystal display apparatus and to a method of producing the same.

2. Description of the Related Art

A liquid crystal display apparatus must have polarizing plates arranged on both sides of a liquid crystal panel based on its image forming system. The polarizing plates to be used are each generally prepared by attaching a protective film on both surfaces of a polarizer. Further, for optical compensation of a liquid crystal panel, an optical compensation film such as a retardation film may be arranged between the polarizing plate and a glass substrate of the liquid crystal panel.

For preventing the glass substrate from being broken by external impact, there is disclosed arrangement of an impact-absorbing pressure-sensitive adhesive layer on a viewer side of a glass substrate (see JP 2005-173462 A). It is proposed that the impact-absorbing pressure-sensitive adhesive layer is arranged on a viewer side of a polarizing plate or between the polarizing plate and the glass substrate.

In a mobile device such as a cell phone, a protective layer formed of a plastic sheet or the like is generally provided on a viewer side of a liquid crystal display. Further, for preventing the liquid crystal display from being broken by external impacts a space (air layer) is provided between the liquid crystal display and the protective layer. However, there is a problem in that reflection occurs at an interface between the protective layer and the air layer and an interface between the air layer and the liquid crystal display to cause degradation in viewing properties. Thus, for assuring impact resistance, improving the viewing properties, and reducing a thickness of the plastic sheet (ultimately, mobile device), the impact-absorbing pressure-sensitive adhesive layer described above is used instead of the air layer.

Meanwhile, the impact-absorbing pressure-sensitive adhesive layer is generally cut to match a size of an optical device to be applied to. However, the impact-absorbing pressure-sensitive adhesive layer typically has a thickness of several hundreds microns for obtaining sufficient impact resistance for practical use. Thus, there is a problem in that a cut surface may deform during cutting to cause adverse effects on display properties of an image display apparatus. Meanwhile, cutting in high yield is desired.

SUMMARY OF THE INVENTION

The present invention has been made in view of solving conventional problems described above, and an object of the present invention is therefore to provide an impact-absorbing pressure-sensitive adhesive sheet causing no adverse effects on display properties and having excellent yield, and a method of producing the same.

An impact-absorbing pressure-sensitive adhesive sheet according to an embodiment of the present invention includes an impact-absorbing pressure-sensitive adhesive layer including an impact-absorbing layer. A side surface of the impact-absorbing pressure-sensitive adhesive layer includes a tapered surface; and the tapered surface has a taper angle of 65° or more.

An impact-absorbing pressure-sensitive adhesive sheet according to another embodiment of the present invention includes a substrate; and a plurality of impact-absorbing pressure-sensitive adhesive pieces each including an impact-absorbing layer and provided on one side of the substrate. A side surface of each of the impact-absorbing pressure-sensitive adhesive pieces includes a tapered surface; and the tapered surface has a taper angle of 65° or more.

In one embodiment of the present invention, the plurality of impact-absorbing pressure-sensitive adhesive pieces are provided at certain intervals on one side of the substrate; and a distance between side surface lower ends of the adjacent impact-absorbing pressure-sensitive adhesive pieces is 30 μm or more.

In another embodiment of the present invention, the impact-absorbing layer has a thickness of 100 to 1,000 μm.

In still another embodiment of the present invention, the impact-absorbing layer has a dynamic storage modulus G' of $1 \times 10^7$ Pa or less at 20° C.

According to another aspect of the present invention, a method of producing an impact-absorbing pressure-sensitive adhesive sheet is provided. The method includes irradiating an impact-absorbing pressure-sensitive adhesive layer including an impact-absorbing layer with laser light for cutting. A cut surface of the impact-absorbing pressure-sensitive adhesive layer includes a tapered surface; and the tapered surface has a taper angle of 65° or more.

In one embodiment of the present invention, a distance between cut surfaces of the impact-absorbing pressure-sensitive adhesive layer is 30 μm or more.

In another embodiment of the present invention, the laser light includes light having a wavelength of at least one of 400 nm or less and/or 1.5 μm or more.

Instill another embodiment of the present invention, the laser includes $CO_2$ laser.

In still another embodiment of the present invention, the method is for producing an impact-absorbing pressure-sensitive adhesive sheet including: a substrate; and a plurality of impact-absorbing pressure-sensitive adhesive pieces each including an impact-absorbing layer and provided on one side of the substrate.

The present invention can provide an impact-absorbing pressure-sensitive adhesive sheet causing no adverse effects on display properties and having excellent yield.

DESCRIPTION OF THE PREFERRED EMBODIMENTS

Hereinafter, preferred embodiments of the present invention will be described, but the present invention is not limited to the embodiments.

A. Overall Structure

Figure 1A:
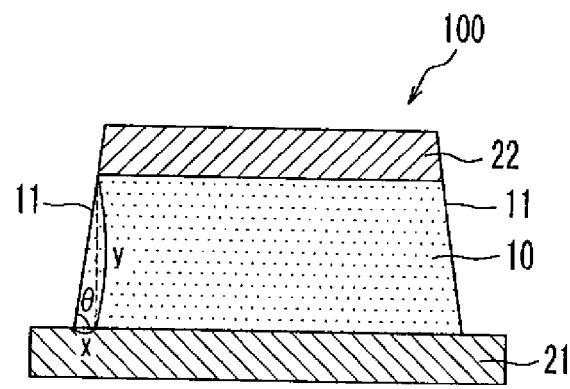
FIGS. 1A to 1C are each a schematic sectional view of an impact-absorbing pressure-sensitive adhesive sheet according to a preferred embodiment of the present invention.
Figure 1B:
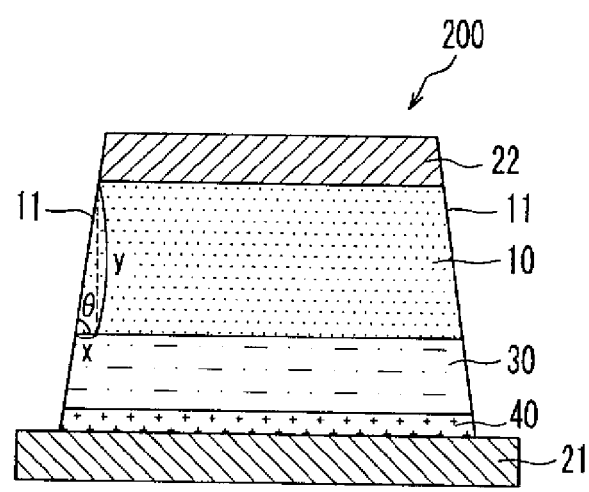
Figure 1C:
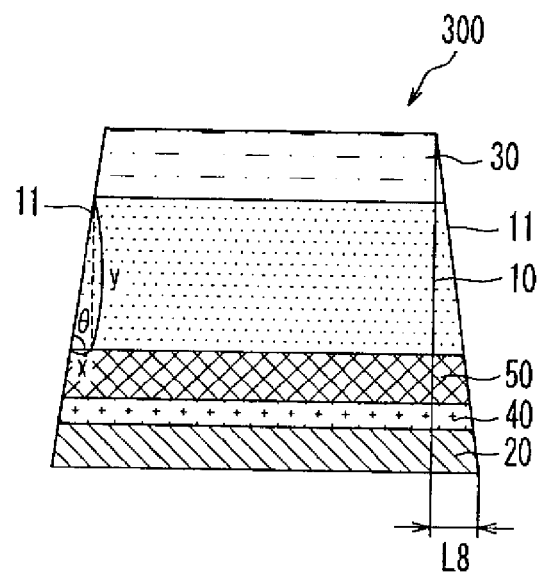

FIG. 1A is a schematic sectional view of an impact-absorbing pressure-sensitive adhesive sheet 100 according to a preferred embodiment of the present invention. The impact-absorbing pressure-sensitive adhesive sheet 100 is provided with an impact-absorbing pressure-sensitive adhesive layer 10 including an impact-absorbing layer. The impact-absorbing pressure-sensitive adhesive sheet 100 is further provided with: a first separator (substrate) 21 arranged on one side of the impact-absorbing pressure-sensitive adhesive layer 10; and a second separator 22 arranged on another side of the impact-absorbing pressure-sensitive adhesive layer 10. FIG. 1B is a schematic sectional view of an impact-absorbing pressure-sensitive adhesive sheet 200 according to another preferred embodiment of the present invention. The impact-absorbing pressure-sensitive adhesive sheet 200 is provided with the impact-absorbing pressure-sensitive adhesive layer 10 including the impact-absorbing layer. The impact-absorbing pressure-sensitive adhesive sheet 200 is further provided with: a first separator (substrate) 21 arranged on one side of the impact-absorbing pressure-sensitive adhesive layer 10; a second separator 22 arranged on another side of the impact-absorbing pressure-sensitive adhesive layer 10; a polarizing plate 30 arranged between the impact-absorbing pressure-sensitive adhesive layer 10 and the first separator 21; and a pressure-sensitive adhesive layer 40 arranged between the polarizing plate 30 and the first separator 21. FIG. 1C is a schematic sectional view of an impact-absorbing pressure-sensitive adhesive sheet 300 according to still another preferred embodiment of the present invention. The impact-absorbing pressure-sensitive adhesive sheet 300 is provided with the impact-absorbing pressure-sensitive adhesive layer 10 including the impact-absorbing layer. The impact-absorbing pressure-sensitive adhesive sheet 300 is further provided with: a separator (substrate) 20 arranged on one side of the impact-absorbing pressure-sensitive adhesive layer 10; the polarizing plate 30 arranged on another side of the impact-absorbing pressure-sensitive adhesive layer 10; a support layer 50 arranged between the impact-absorbing pressure-sensitive adhesive layer 10 and the separator 20; and the pressure-sensitive adhesive layer 40 arranged between the support layer 50 and the separator 20.

As shown in FIGS. 1A to 1C, the impact-absorbing pressure-sensitive adhesive sheet of the present invention may further be provided with any appropriate layers (films). The impact-absorbing pressure-sensitive adhesive sheet of the present invention may further be provided with any appropriate optical compensation layer although not shown. The kind, number, arrangement, and the like of such an optical compensation layer may appropriately be selected in accordance with the purpose. Further, in the embodiment as shown in FIG. 1C, for example, a surface treated layer may be provided on the polarizing plate 30 on a side having no impact-absorbing pressure-sensitive adhesive layer 10 formed. Details of respective layers will be described below.

Figure 2A:
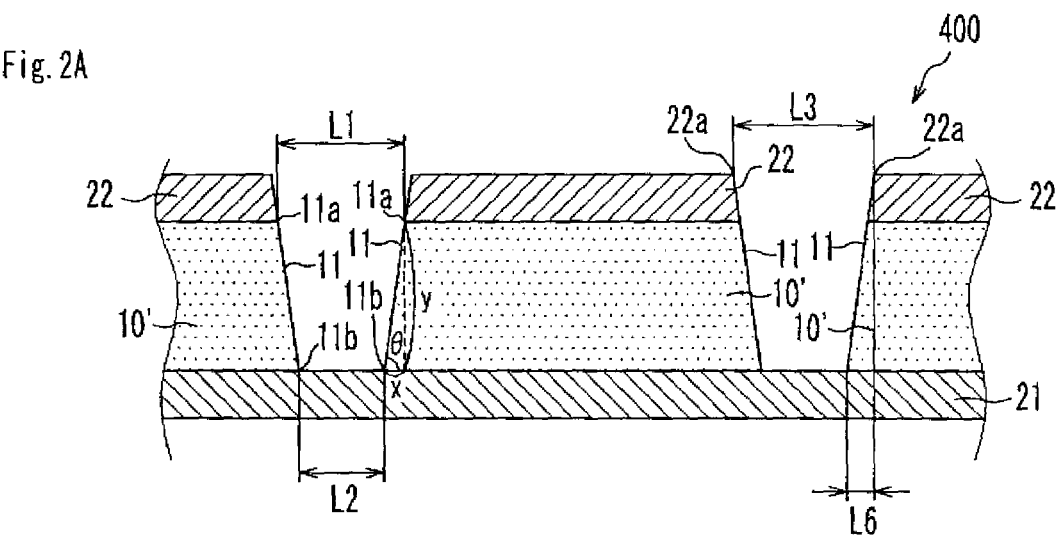
FIGS. 2A and 2B are each a schematic sectional view of an impact-absorbing pressure-sensitive adhesive sheet according to a preferred embodiment of the present invention.
Figure 2B:
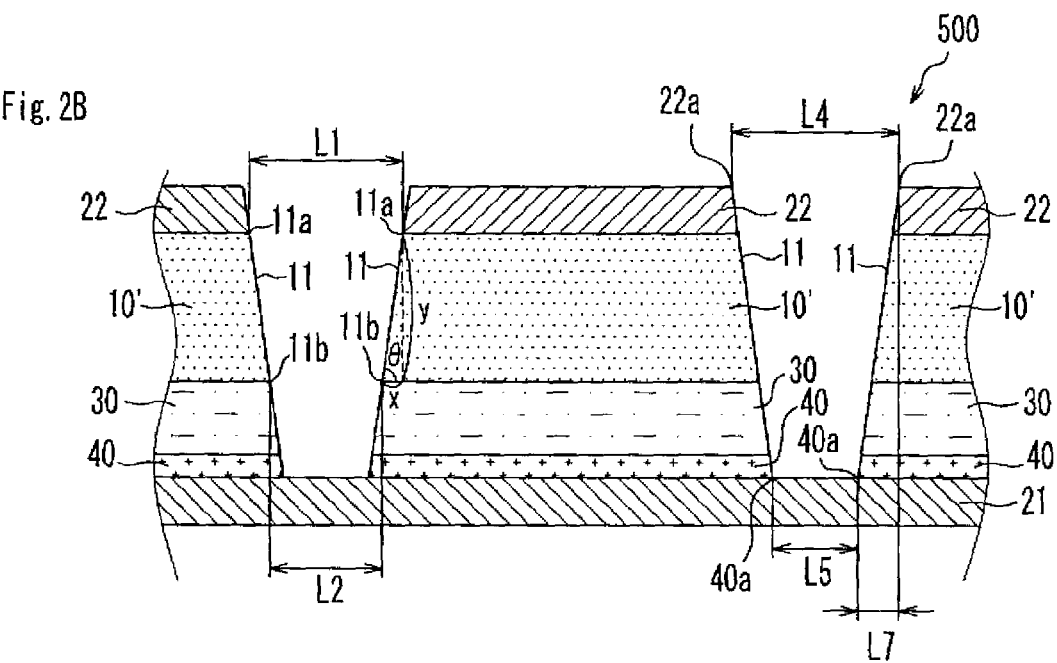

FIG. 2A is a schematic sectional view of an impact-absorbing pressure-sensitive adhesive sheet 400 according to another preferred embodiment of the present invention. The impact-absorbing pressure-sensitive adhesive sheet 400 is provided with: the first separator (substrate) 21; and impact-absorbing pressure-sensitive adhesive pieces 10', 10', and 10' provided on one side of the first separator 21. The impact-absorbing pressure-sensitive adhesive sheet 400 is further provided with the second separator 22 arranged on each impact-absorbing pressure-sensitive adhesive piece 10' on a side having no first separator 21 arranged. FIG. 2B is a schematic sectional view of an impact-absorbing pressure-sensitive adhesive sheet 500 according to still another preferred embodiment of the present invention. The impact-absorbing pressure-sensitive adhesive sheet 500 is provided with: the first separator (substrate) 21; and the impact-absorbing pressure-sensitive adhesive pieces 10', 10', and 10' provided on one side of the first separator 21. The impact-absorbing pressure-sensitive adhesive sheet 500 is further provided with: the second separator 22 arranged on each impact-absorbing pressure-sensitive adhesive piece 10' on a side having no first separator 21 arranged; the polarizing plate 30 arranged between the impact-absorbing pressure-sensitive adhesive piece 10' and the first separator 21; and the pressure-sensitive adhesive layer 40 arranged between the polarizing plate 30 and the first separator 21. As shown in FIGS. 2A and 2B, the plurality of impact-absorbing pressure-sensitive adhesive pieces is provided on one side of the substrate. Thus, excellent operability may be provided during lamination to an optical device or the like, and excellent yield may be obtained.

B. Impact-absorbing Pressure-sensitive Adhesive Layer (Impact-absorbing Pressure-sensitive Adhesive Pieces)

Side surfaces 11 and 11 of the impact-absorbing pressure-sensitive adhesive layer 10 (impact-absorbing pressure-sensitive adhesive piece 10') are tapered surfaces. A taper angle of each of the taper surfaces is 65° or more, and is preferably as close to 90° as possible. Such a structure causes no adverse effects on display properties of an image display apparatus and may provide excellent yield. The taper angle is preferably 75° or more, and more preferably 80° or more. Such a taper angle may provide excellent releasability from the separator (substrate). As a result, excellent operability during lamination to an optical device may be provided. Note that in the specification of the present invention, the term "tapered surface" also includes the case where a side surface is substantially tapered state. The phrase "substantially tapered state" also includes the case where a side surface is not smooth within a range providing no adverse effects on display properties of an image display apparatus. The term "taper angle" refers to θ shown in FIGS. 1A to 1C and 2A and 2B, and is a value calculated from an extended width x from an upper surface of a lower surface of the impact-absorbing pressure-sensitive adhesive layer (impact-absorbing pressure-sensitive adhesive piece) and a thickness y of the impact-absorbing pressure-sensitive adhesive layer.

Preferably, the plurality of impact-absorbing pressure-adhesive pieces 10' are provided on one side of the substrate 21 at certain intervals. A spacing (distance between the side surface 11 and the side surface 11) between the adjacent impact-absorbing pressure-sensitive adhesive pieces 10' and 10' may be set to any appropriate value in accordance with a structure of the impact-absorbing pressure-sensitive adhesive sheet or the like. A distance L1 between a side surface upper end 11a and a side surface upper end 11a is preferably 70 μm or more, more preferably 90 to 230 μm, and particularly preferably 110 to 170 μm. A distance L2 between a side surface lower end 11b and a side surface lower end 11b is preferably 30 μm or more, more preferably 30 to 120 μm, and particularly preferably 30 to 60 μm. The spacings between the adjacent impact-absorbing pressure-sensitive adhesive pieces are adjusted within the above ranges. Thus, excellent releasability from the substrate may be provided, and excellent operability during lamination to an optical device may be provided. Further, re-adhesion of the side surfaces of the adjacent impact-absorbing pressure-sensitive adhesive layer may be prevented, the tapered surfaces are favorably maintained, and excellent display properties of an image display apparatus maybe provided. Meanwhile, excellent yield may be obtained.

Note that in the embodiment shown in FIG. 2A, a distance L3 between side surface upper ends 22a of the adjacent second separators 22 is preferably 80 μm or more, more preferably 100 to 350 μm, and particularly preferably 120 to 310 μm. Further, in the embodiment shown in FIG. 2B, a distance L4 between side surface upper ends 22a of the adjacent second separators 22 is preferably 80 μm or more, more preferably 100 to 410 μm, and particularly preferably 120 to 370 μm. Further, a distance L5 between side surface lower ends 40a of the adjacent pressure-sensitive adhesive layers 40 is preferably 30 μm or more, more preferably 30 to 100 μm, and particularly preferably 30 to 50 μm.

The side surface 11 of the impact-absorbing pressure-sensitive adhesive piece 10' is a tapered surface and satisfies the above taper angle, and the spacing between the adjacent impact-absorbing pressure-sensitive adhesive pieces 10' and 10' satisfies the above ranges. Thus, releasability may be remarkably improved. As a result, remarkably excellent operability may be obtained.

The impact-absorbing pressure-sensitive adhesive layer 10 (impact-absorbing pressure-sensitive adhesive piece 10') includes at least an impact-absorbing layer. Hereinafter, the impact-absorbing layer will be described.

B-1 Impact-absorbing Layer

The impact-absorbing layer mentioned above can be made of any appropriate adhesive. Specific examples thereof include acrylic adhesives containing a (meth)acrylic polymer. Examples of monomer that forms the (meth)acrylic polymer include alkyl(meth)acrylate. Specific examples of alkyl (meth)acrylate include butyl(meth)acrylate, isobutyl(meth) acrylate, hexyl(meth)acrylate, 2-ethylhexyl(meth)acrylate, isooctyl(meth)acrylate, isononyl(meth)acrylate, allyl(meth) acrylate, lauryl(meth)acrylate, and stearyl(meth)acrylate.

The above-mentioned (meth)acrylic polymer is preferably obtained from copolymerization between alkyl(meth)acrylate and hydroxyl group-containing monomer. Specific examples of hydroxyl group-containing monomers include hydroxyalkyl(meth)acrylate such as 2-hydroxyethyl(meth) acrylate, 2-hydroxypropyl(meth)acrylate, 4-hydroxybutyl (meth)acrylate, 6-hydroxyhexyl(meth)acrylate, 8-hydroxyoctyl(meth)acrylate, 10-hydroxydecyl(meth)acrylate, 12-hydroxylauryl(meth)acrylate and (4-hydroxymethylcyclohexyl)-methylacrylate, polyethylene glycol(meth)acrylate, and polypropylene glycol(meth)acrylate.

Any appropriate polymerization initiator can be used in polymerization of the above-mentioned (meth)acrylic polymer. Specific examples of polymerization initiator include acetophenon-based photopolymerization initiators such as 4-(2-hydroxyethoxy)phenyl(2-hydroxy-2-propyl)ketone, α-hydroxy-α,α'-dimethylacetophenon, methoxyacetophenon, 2,2-dimethoxy-2-phenylacetophenon, 2,2-diethoxyacetophenon, 1-hydroxycyclohexylphenylketone, and 2-methyl-1-[4-(methylthio)-phenyl]-2-morphorinopropane-1.

Cross-linking agent may be added in polymerization described above. Examples of cross-linking agent include polyfunctional(meth)acrylate. Specific examples of polyfunctional(meth)acrylate include hexanediol di(meth)acrylate, (poly)ethylene glycol di(meth)acrylate, (poly)propylene glycol di(meth)acrylate, neopentyl glycol di(meth)acrylate, pentaerythritol di(meth)acrylate, trimethylolpropane tri (meth)acrylate, pentaerythritol tri(meth)acrylate, dipentaerythritol hexa(meth)acrylate, epoxy(meth)acrylate, polyester(meth)acrylate, and urethane(meth)acrylate.

A dynamic storage modulus G' of the impact-absorbing layer at 20° C. is preferably $1 \times 10^7$ Pa or less, and more preferably $1 \times 10^3$ to $7 \times 10^6$ Pa because excellent impact-absorbing ability may be provided.

A thickness of the impact-absorbing layer is preferably 100 to 1,000 μm, and more preferably 100 to 600 μm. A thickness thereof of less than 100 μm may not provide sufficient impact-absorbing ability, and a thickness thereof of more than 1,000 μm may cause problems in viewing properties.

Note that the impact-absorbing layer may employ a pressure-sensitive adhesive layer for prevention of cracks in glass described in for example JP 2005-173462 A, which is herein incorporated by reference.

B-2. Other Layers

The impact-absorbing pressure-sensitive adhesive layer (impact-absorbing pressure-sensitive adhesive piece) may further include an undercoat layer arranged on one surface or both surfaces of the impact-absorbing layer. The undercoat layer is provided, to thereby improve pressure-sensitive adhesive properties of the impact-absorbing layer to an adherend. A material used for forming the undercoat layer may employ any appropriate material. As a specific example, description will be given of an undercoat layer formed by crosslinking a pressure-sensitive adhesive composition.

The pressure-sensitive adhesive composition preferably contains a (meth)acrylic polymer and an isocyanate-based compound. Similarly to the section B-1 described above, the (meth)acrylic polymer refers to a polymer or a copolymer synthesized from an acrylate-based monomer and/or a methacrylate-based monomer (referred to as (meth)acrylate in the specification of the present invention). In the case where the (meth)acrylic polymer is a copolymer, an arrangement state of copolymer molecules is not particularly limited. The copolymer may be a random copolymer, a block copolymer, or a graft copolymer. A preferred molecular arrangement state is a random copolymer.

The (meth)acrylic polymer is obtained through homopolymerization or copolymerization of alkyl (meth)acrylate. An alkyl group of alkyl(meth)actylate may be linear, branched, or cyclic. The number of carbon atoms in the alkyl group of alkyl(meth)acrylate is preferably about 1 to 18, and more preferably 1 to 10.

Specific examples of the above-mentioned alkyl(meth) acrylate include methyl(meth)acrylate, ethyl(meth)acrylate, propyl(meth)acrylate, n-butyl(meth)acrylate, iso-butyl (meth)acrylate, t-butyl(meth)acrylate, n-pentyl(meth)acrylate, iso-pentyl(meth)acrylate, n-hexyl(meth)acrylate, iso-hexyl(meth)acrylate, n-heptyl(meth)acrylate, iso-heptyl (meth)acrylate, 2-ethylhexyl(meth)acrylate, n-octyl(meth) acrylate, iso-octyl(meth)acrylate, n-nonyl(meth)acrylate, iso-nonyl(meth)acrylate, lauryl(meth)acrylate, stearyl(meth) acrylate, and cyclohexyl(meth)acrylate. They may be used alone or in combination. When using them in combination, alkyl group having average of 3 to 9 carbon atoms is preferable for the alkyl(meth)acrylate.

The (meth)acrylic polymer may be a copolymer of alkyl (meth)acrylate and hydroxyl group-containing (meth)acrylate. In this case, the number of carbon atoms in the alkyl group of alkyl(meth)acrylate is preferably 1 to 8, more preferably 2 to 8, particularly preferably 2 to 6, and most preferably 4 to 6. The alkyl group of alkyl(meth)acrylate may be linear or branched.

Specific examples of hydroxyl group-containing (meth) acrylate described above include 2-hydroxyethyl(meth)acrylate, 3-hydroxypropyl(meth)acrylate, 2-hydroxypropyl (meth)acrylate, 4-hydroxybutyl(meth)acrylate, 3-hydroxybutyl(meth)acrylate, 2-hydroxybutyl(meth)acrylate, 5-hydroxypentyl(meth)acrylate, 3-hydroxy-3-methylbutyl(meth)acrylate, 6-hydroxyhexyl(meth)acrylate, 7-hydroxyheptyl(meth)acrylate, 8-hydroxyoctyl(meth)acrylate, 10-hydroxydecyl(meth)acrylate, 12-hydroxylauryl(meth)

acrylate, and (4-hydroxymethylcyclohexyl)-methylacrylate. They may be used alone or in combination.

The number of carbon atoms in a hydroxyalkyl group of hydroxyl group-containing (meth)acrylate is preferably equal to or more than the number of carbon atoms in the alkyl group of alkyl(meth)acrylate. The number of carbon atoms in the hydroxyalkyl group of hydroxyl group-containing (meth) acrylate is preferably 2 to 8, and more preferably 4 to 6. In this way, the number of carbon atoms is adjusted, to thereby provide excellent reactivity with an isocyanate-based compound described below. In the case where 4-hydroxybutyl (meth)acrylate is used as hydroxyl group-containing (meth) acrylate, for example, methyl(meth)acrylate, ethyl(meth) acrylate, propyl(meth)acrylate, or butyl(meth)acrylate is preferably used as alkyl(meth)acrylate.

A copolymerization amount of hydroxyl group-containing (meth)acrylate is preferably 0.01 to 10 mol %, more preferably 0.1 to 10 mol %, particularly preferably 0.2 to 5 mol %, and most preferably 0.3 to 1.1 mol %. A copolymerization amount with the above ranges may provide an undercoat layer having excellent adhesive property, durability, and stress relief property.

The (meth)acrylic polymer may be obtained through copolymerization with other components other than the above-mentioned alkyl(meth)acrylate and hydroxyl group-containing (meth)acrylate. The other components are not particularly limited, but preferred examples thereof include (meth)acrylic acid, benzyl(meth)acrylate, methoxyethyl(meth)acrylate, ethoxymethyl(meth)acrylate, phenoxyethyl(meth)acrylate, (meth)acrylamide, vinyl acetate, and (meth)acrylonitrile. A copolymerization amount of the other components is preferably 100 parts by weight or less, and more preferably 50 parts by weight or less with respect to 100 parts by weight of alkyl(meth)acrylate.

A weight average molecular weight (Mw) of the (meth) acrylic polymer is preferably 1,000,000 or more, more preferably 1,200,000 to 3,000,000, and particularly preferably 1,200,000 to 2,500,000.

Examples of the isocyanate-based compound described above include isocyanate monomer such as 2,4-(or 2,6-) tolylene diisocyanate, xylylene diisocyanate, 1,3-bis(isocyanatemethyl)cyclohexane, hexamethylene diisocyanate, norbornene diisocyanate, chlorphenylene diisocyanate, tetramethylene diisocyanate, isophorone diisocyanate, diphenylmethane diisocyanate, trimethylolpropanexylene diisocyanate, and hydrogenated diphenylmethane diisocyanate; adduct isocyanate compounds obtained by addition of polyalchohol such as trimethylolpropane to those isocyanate-monomer; isocyanurate compound; biuret compounds; and urethane prepolymer-type isocyanates obtained by addition reaction of any appropriate polyetherpolyol, polyesterpolyol, acrylpolyol, polybutadienepolyol, polyisoprenepolyol, or the like. They may be used alone or in combination.

The isocyanate-based compound may employ a commercially available product as it is. Examples of the commercially available isocyanate-based compound include: Takenate series (trade names "D-110N, 500, 600, 700, etc.") available from Mitsui Takeda Chemicals, Inc.; and Coronate series (trade names "L, MR, EH, HL, etc.", for example) available from Nippon Polyurethane Industry Co., Ltd.).

A mixing amount of the isocyanate-based compound may be set to any appropriate amount in accordance with the purpose. For example, the mixing amount thereof is preferably 0.1 to 1.5 parts by weight, more preferably 0.3 to 1.0 part by weight, and particularly preferably 0.4 to 0.8 part by weight with respect to 100 parts by weight of the (meth) acrylic polymer. The mixing amount of the isocyanate-based compound is adjusted within the above ranges, to thereby provide appropriate stress relief property and excellent heat stability. Further, favorable adhesive property may be provided even in a harsh (high temperature and high humidity) environment.

The pressure-sensitive adhesive composition may further contain various additives without departing from the purpose of the present invention. Examples of the additives include a plasticizer, a heat stabilizer, a photo stabilizer, a lubricant, an antioxidant, a UV absorber, a flame retardant, a colorant, an antistatic agent, a compatibilizing agent, a crosslinking agent, a coupling agent, a thickener, and a pigment.

A mixing amount of the other additives may be set to any appropriate amount in accordance with the purpose. The mixing amount thereof is preferably more than 0 and 5 parts by weight or less with respect to 100 parts by weight of the (meth)acrylic polymer.

A thickness of the undercoat layer may be set to any appropriate value. The thickness thereof is preferably 1 to 50 μm, more preferably 10 to 30 μm, and particularly preferably 20 to 25 μm.

C. Polarizing Plate

The polarizing plate 30 typically includes a polarizer and a protective film arranged on at least one side of the polarizer.

C-1. Polarizer

Any appropriate polarizer may be employed as the above-mentioned polarizer in accordance with the purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based oriented film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferable because of high polarized dichromaticity. A thickness of the polarizer is not particularly limited, but is generally about 5 to 80 μm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required. Washing the polyvinyl alcohol-based film with water not only allows removal of contamination on a film surface or washing away of an antiblocking agent, but also provides an effect of preventing nonuniformity such as uneven coloring by swelling of the polyvinyl alcohol-based film. The stretching of the film may be performed after coloring of the film with iodine, performed during coloring of the film, or performed followed by coloring of the film with iodine. The stretching may be performed in an aqueous solution of boric acid or potassium iodide, or in a water bath.

C-2. Protective Film

Any appropriate film, which can be used as a protective film for a polarizing plate, may be employed as the above-mentioned protective film. Specific examples of a material used as a main component of the film include transparent resins such as a cellulose-based resin such as triacetylcellulose (TAC), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, an acrylic resin, and an acetate-based resin. Another example thereof includes thermosetting resin or UV-curing resin such as an acrylic, urethane-based, acrylic urethane-based, epoxy-based, or silicone-based. Still another example thereof includes a glassy polymer such as a siloxane-based polymer. Further, a polymer film described in JP 2001-343529 A (WO 01/37007) may also be used. To be specific, the film is formed of a resin composition containing a thermoplastic resin having a substituted or unsubstituted imide group on a side chain, and a thermoplastic resin having a substituted or unsubstituted phenyl group and a nitrile group on a side chain. A specific example thereof includes a resin composition containing an alternate copolymer of isobutene and N-methyl-maleimide, and an acrylonitrile/styrene copolymer. The polymer film may be an extruded product of the above-mentioned resin composition, for example. Of those, TAC, a polyimide-based resin, a polyvinyl alcohol-based resin and a glassy polymer are preferable, and TAC is more preferable.

It is preferable that the protective film be transparent and have no color. To be specific, the protective film has a thickness retardation of preferably −90 nm to +90 nm, more preferably −80 nm to +80 nm, and most preferably −70 nm to +70 nm.

The protective film has any appropriate thickness direction as long as the preferable thickness direction retardation can be obtained. To be specific, the thickness of the protective film is preferably 5 mm or less, more preferably 1 mm or less, further more preferably 1 to 500 μm, and most preferably 5 to 150 μm.

The lamination of the polarizer and the protective film may be conducted through any appropriate pressure-sensitive adhesive layer or adhesive layer.

For example, in FIG. 1C, the protective film to be provided above (on a side having no impact-absorbing pressure-sensitive adhesive layer 10 formed) the polarizer may be provided with a surface treated layer as required. Specific examples of the surface treated layer include a hard coat treated layer, an antireflection treated layer, an anti-sticking treated layer, and an anti-glare treated layer.

D. Support Layer

The support layer 50 may typically be formed of a plastic film. The support layer may be a monolayer of a plastic film, or a laminate of plastic films. The plastic film may be formed of any appropriate material to be used as an optical film. Specific examples of the material include a norbornene-based resin, a polycarbonate-based resin, a cellulose-based resin, a (meth)acrylic resin, a polyester-based resin, and a nylon-based resin. Note that the support layer may be formed of a plastic film subjected to stretching treatment.

A dynamic storage modulus G' of the support layer at 20° C. is preferably $2 \times 10^8$ Pa or more, more preferably $2 \times 10^8$ Pa to $1 \times 10^{11}$ Pa, and particularly preferably $5 \times 10^8$ Pa to $1 \times 10^{10}$ Pa. The support layer has such a dynamic storage modulus G', and thus may have excellent self-supporting property. As a result, a polarizing plate provided with an impact-absorbing pressure-sensitive adhesive layer having excellent rework property and capable of effectively suppressing formation of bubbles may be obtained.

A thickness of the support layer may be set to any appropriate value. The thickness thereof is preferably 5 to 500 μm, more preferably 10 to 200 μm, and particularly preferably 10 to 100 μm. The support layer has such a thickness, and thus may have excellent self-supporting property. As a result, a polarizing plate provided with an impact-absorbing pressure-sensitive adhesive layer having excellent rework property and capable of effectively suppressing formation of bubbles may be obtained.

The support layer may be optically isotropic or optically anisotropic (birefringent). In the case where the support layer has optical isotropic property, the polarizing plate provided with an impact-absorbing pressure-sensitive adhesive layer to be obtained may be used without providing substantial effects on display properties of a liquid crystal display apparatus. In the case where the support layer has optical anisotropic property, the support layer may also serve as an optical compensation layer. In the case where the support layer has optical anisotropic property, optical properties (such as Δnd and Rth) may appropriately be set in accordance with drive mode and the like of a liquid crystal cell to be compensated. Note that in the specification of the present invention, the phrase "has optical isotropic property" includes the case where the support layer has substantial optical isotropic property. The phrase "has substantial optical isotropic property" refers to the case where Δnd is less than 10 nm and an absolute value of Rth is less than 10 nm.

E. Pressure-sensitive Adhesive Layer

A material used for forming the pressure-sensitive adhesive layer 40 may employ any appropriate pressure-sensitive adhesive. A specific example thereof is the undercoat layer described in the above section B-2.

F. Separator (Substrate)

The separators (substrates) 20, 21, and 22 each typically include a supporting substrate, and a releasability-provided layer arranged on at least one side (the side having the impact-absorbing pressure-sensitive adhesive layer arranged) of the supporting substrate. The kind and application amount of a release agent used for forming the releasability-provided layer may appropriately be selected, to thereby easily adjust peel force of the separator.

The supporting substrate may employ any appropriate plastic film. The supporting substrate may be formed of a monolayer of a plastic film, or a laminate of plastic films. The plastic film may be formed of any appropriate material as long as it is capable of exerting functions of the separator. Specific examples thereof include: nylons; a halogen-containing polymer such as polyvinyl chloride; polyolefins such as polyethylene and polypropylene; and polyesters such as polyethylene terephthalate (PET). Of those, a polyester film is preferred from a viewpoint of punching workability or the like. Further, a material used for the supporting substrate preferably contains no component serving as a catalytic poison to a releasability-provided layer (such as a silicone resin) Note that a surface of the supporting substrate may be subjected to metal evaporation.

The releasability-provided layer may be formed of any appropriate release agent. Specific examples thereof include: a silicone-based release agent such as a condensation-type, addition-type, etc. thermosetting silicone-based release agent; a radiation-curable silicone-based release agent cured by UV light, electron beam, or the like; a fluorine-based release agent containing an acrylic copolymer obtained through polymerization of a fluorine-containing ester of (meth)acrylic acid, an alkyl ester of (meth)acrylic acid having an alkyl group of 8 or less carbon atoms, and the like; and a long-chain alkyl-based release agent containing an alkyl-based copolymer obtained through polymerization of an alkyl ester of (meth)acrylic acid having a long-chain alkyl group of 12 to 22 carbon atoms, an alkyl ester of (meth)acrylic acid having an alkyl group of 8 or less carbon atoms, and the like (JP 29-3144 B, JP 29-7333 B). Of those, a silicone-based release agent is preferred.

The releasability-provided layer may employ a release layer described in for example JP 2004-346093 A, which is herein incorporated by reference.

A thickness of the separator is typically about 15 to 100 μm, and preferably about 30 to 100 μm.

G. Production Method

A method of producing an impact-absorbing pressure-sensitive adhesive sheet of the present invention includes a step of irradiating an impact-absorbing pressure-sensitive adhesive layer including an impact-absorbing layer with laser light for cutting. A typically employed method involves: producing a laminate by laminating an impact-absorbing pressure-sensitive adhesive layer and desired respective layers (films) described above; and irradiating the laminate with laser light (by laser ablation or the like) for cutting. The lamination order and lamination method for the respective layers (films) may employ any appropriate method. Hereinafter, the production method will be described more specifically.

The impact-absorbing pressure-sensitive adhesive sheet as shown in FIG. 2A can be obtained by: producing a laminate by laminating a first separator (substrate), an impact-absorbing pressure-sensitive adhesive layer, and a second separator in the order given; and irradiating the laminate from a side having no substrate arranged (side of the second separator) with laser light for cutting the laminate to the substrate (half cut). The impact-absorbing pressure-sensitive adhesive sheet as shown in FIG. 2B can be obtained by: producing a laminate by laminating a first separator (substrate), a pressure-sensitive adhesive layer, a polarizing plate, an impact-absorbing pressure-sensitive adhesive layer, and a second separator in the order given; and irradiating the laminate from a side having no substrate arranged (side of the second separator) with laser light for cutting the laminate to the substrate (half cut). Impact-absorbing pressure-sensitive adhesive sheets as shown in FIGS. 1A and 1B can be obtained by further cutting the impact-absorbing pressure-sensitive adhesive sheets shown in FIGS. 2A and 2B, respectively. That is, the impact-absorbing pressure-sensitive adhesive sheets as shown in FIGS. 1A and 1B can be obtained by cutting parts of the first separator (substrate) 21 having no impact-absorbing pressure-sensitive adhesive piece 10' formed. A cutting method of the first separator (substrate) 21 may employ any appropriate method.

The impact-absorbing pressure-sensitive adhesive sheet as shown in FIG. 1C can be obtained by: producing a laminate by laminating a separator, a pressure-sensitive adhesive layer, a support layer, an impact-absorbing pressure-sensitive adhesive layer, and a polarizing plate in the order given; and irradiating the laminate with laser light for thoroughly cutting the laminate (full cut). In the case of full cut, an irradiation direction of laser light may be changed in accordance with the kind and the like of a layer to be formed. In this way, a cutting depth is adjusted, and thus a desired impact-absorbing pressure-sensitive adhesive sheet may be obtained.

In the case of half cut and the case of full cut, cutting is preferably conducted so that a distance between cut surfaces of the adjacent impact-absorbing pressure-sensitive adhesive layers is 30 μm or more. That is, in the case of half cut, cutting is preferably conducted so that the distance L2 between a side surface lower end 11b and a side surface lower end 11b of the adjacent impact-absorbing pressure-sensitive adhesive pieces is 30 μm or more, more preferably 30 to 120 μm, and particularly preferably 30 to 60 μm. Thus, re-adhesion of the cut surfaces maybe prevented, and excellent operability during lamination to an optical device may be obtained. Further, excellent yield may be obtained. The distance between the cut surfaces is adjusted within the above ranges, and thus the obtained impact-absorbing pressure-sensitive adhesive sheet may have excellent releasability from the substrate and excellent operability during lamination to an optical device. Further, re-adhesion of the adjacent cut surfaces may be prevented, the tapered surfaces are favorably maintained, and excellent display properties of an image display apparatus may be provided. Meanwhile, excellent yield may be obtained.

The laser light preferably includes light having a wavelength of at least 400 nm or less and/or 1.5 μm or more, more preferably 2 to 30 μm, and particularly preferably 8 to 12 μm. Thus, a material used for forming each layer (film) such as the impact-absorbing pressure-sensitive adhesive layer may efficiently absorb laser light and may be cut favorably. As a result, the desired taper angle and distance between side surfaces (cut surfaces) may easily be attained.

The laser may employ any appropriate laser. Specific examples thereof include: gas laser such as $CO_2$ laser or excimer laser; solid laser such as YAG laser; and semiconductor laser. $CO_2$ laser is preferred because the $CO_2$ laser light may include light having preferred wavelengths. Further, the $CO_2$ laser has a wide applicable range of irradiation output conditions, allows easy control of the cutting depth, easily satisfies the desired taper angle, and provides excellent cut surfaces. Further, the $CO_2$ laser easily provides the distance between the cut surfaces, suppresses re-adhesion of the cut surfaces, and provides excellent productivity.

Irradiation conditions of laser light (for example, output conditions, transfer rate, and number of irradiation) may employ any appropriate conditions in accordance with a cutting target, a cutting depth, and the like. In the case where $CO_2$ laser is used, the output conditions are 10 to 800 W, preferably 10 to 200 W, and more preferably 10 to 100 W. In the case where $CO_2$ laser is used, the transfer rate is typically 50 to 700 mm/second, and preferably 100 to 500 mm/second. The number of irradiation is typically once or twice.

G. Use Method

A method of using an impact-absorbing pressure-sensitive adhesive sheet of the present invention may employ any appropriate method. A typical example of the method involves peeling the substrate (separator) and attaching the peeled surface to a surface of an optical device.

EXAMPLES

Hereinafter, the present invention will be described more specifically by way of examples, but the present invention is not limited to the examples. Note that parts and % in examples refer to parts by weight and wt % unless otherwise noted.

Production Example 1

Production of Impact-Absorbing Layer

Into a reaction vessel equipped with a condenser, a nitrogen introduction pipe, a thermometer, a UV irradiation device, and a stirring device, 83.6 parts of 2-ethylhexyl acrylate, 16.4 parts of 4-hydroxybutyl acrylate, and 0.05 part of 2,2-dimethoxy-2-phenylacetophenone ("Irgacure-651", available from Ciba Speciality Chemicals) and 0.05 part of 1-cyclohexylphenyl ketone ("Irgacure Ir-184", available from Ciba Speciality Chemicals) as a photopolymerization initiator were charged. The mixture was irradiated with UV light for polymerization, and an acrylic polymer/monomer mixed liquid having a polymerization rate of 10% was obtained. Next, into 100 parts of this mixed liquid, 0.2 part of trimethylpropane triacrylate as a crosslinking agent and 0.15 part of 1-hydroxycyclohexylphenyl ketone ("Irgacure Ir-184", available from Ciba Speciality Chemicals) as a photopolymerization initiator were mixed, to thereby obtain an application liquid.

The application liquid obtained above was applied onto a substrate (polyester-based separator having a thickness of 100 μm, "PET SEPA MRF", available from Mitsubishi Polyester Film Corporation), and an upper surface thereof was covered with a substrate having lower peel force than that of the substrate (polyester-based separator having a thickness of 75 μm, "PET SEPA MRN", available from Mitsubishi Polyester Film Corporation), to thereby obtain a laminate. The obtained laminate was irradiated with UV light at 4,000 mJ/cm$^2$ by using a UV lamp under cooling at −15° C. for photopolymerization, to thereby obtain an impact-absorbing layer having a thickness of 204 μm. A dynamic storage modulus G' of the obtained impact-absorbing layer at 20° C. was $1 \times 10^5$ Pa.

Production Example 2

Production of Undercoat Layer

Into a four-necked flask equipped with a condenser, a stirring blade, and a thermometer, a solution prepared by mixing 100 parts of butyl acrylate, 5 parts of acrylic acid, 0.1 part of 4-hydroxybutyl acrylate, and 0.2 part of benzoyl peroxide with 100 parts of ethyl acetate was added for a reaction at 60° C. for 7 hours, to thereby obtain a solution of an acrylic polymer having a solid content of 40%. To 100 parts of the acrylic polymer solution in solid content, 1 part of an isocyanate-based compound in solid content (Coronate L, available from Nippon Polyurethane Industry Co., Ltd.) was added, and ethyl acetate was added, to thereby prepare an undercoat solution having a solid content of 30%. The obtained undercoat solution was applied onto a substrate (polyester-based separator having a thickness of 38 μm) by a reverse roll coat method, and the whole was dried at 150° C. for 3 minutes for evaporation of a solvent, to thereby produce an undercoat layer. A thickness of the obtained undercoat layer after drying was 23 μm.

Example 1

The substrate ("PET SEPA MRN") on one side of the impact-absorbing layer obtained above was peeled off, and the undercoat layer obtained above and a first separator (substrate) were laminated to this peeled surface in the order given. Next, the substrate ("PET SEPA MRF") on another side of the impact-absorbing layer was peeled off, and the undercoat layer obtained above and a second separator were laminated to this peeled surface in the order given. A PET film (trade name "MDAR", available from Toyo Metallizing Co., Ltd.) having a thickness of 75 μm was used as the first separator. A PET film (polyester film, trade name "MRV", available from Mitsubishi Polyester Film Corporation) having a thickness of 75 μm was used as the second separator. In this way, a laminate A having a structure of first separator (75 μm)/impact-absorbing pressure-sensitive adhesive layer (250 μm)/second separator (75 μm) was produced.

The laminate A obtained above was irradiated with laser light from CO$_2$ laser (trade name "SILAS-SAM (SPL2305 type)", manufactured by Shibuya Kogyo Co., Ltd.), and the second separator and the impact-absorbing pressure-sensitive adhesive layer were cut (half cut), to thereby produce the impact-absorbing pressure-sensitive adhesive sheet as shown in FIG. 2A. Dimensions of the obtained impact-absorbing pressure-sensitive adhesive piece were 40 mm in length×30 mm in width. Cutting by laser light was conducted under the conditions of: an output of 50 W; a transfer rate of 400 mm/second; a focus of 66 mm; and the number of irradiation of once. Note that the focus refers to a distance from an outermost surface of a lens of laser to a surface of the laminate (second separator).

Example 2

An impact-absorbing pressure-sensitive adhesive sheet was produced in the same manner as in Example 1 except that: the focus was changed to 64 mm.

Example 3

An impact-absorbing pressure-sensitive adhesive sheet was produced in the same manner as in Example 1 except that: the output was changed to 25 W; and the transfer rate was changed to 200 mm/second.

Example 4

An impact-absorbing pressure-sensitive adhesive sheet was produced in the same manner as in Example 1 except that: the output was changed to 25 W; the transfer rate was changed to 200 mm/second; and the focus was changed to 64 mm.

Example 5

An impact-absorbing pressure-sensitive adhesive sheet was produced in the same manner as in Example 1 except that: the output was changed to 25 W; the transfer rate was changed to 200 mm/second; and the focus was changed to 62 mm.

Example 6

The substrate ("PET SEPA MRN") on one side of the impact-absorbing layer obtained above was peeled off, and the undercoat layer obtained above, a polarizing plate (trade name, TEG1465DUHC, available from Nitto Denko Corporation) having a thickness of 100 μm, the undercoat layer obtained above, and a first separator (substrate) were laminated to this peeled surface in the order given. Next, the substrate ("PET SEPA MRF") on another side of the impact-absorbing layer was peeled off, and the undercoat layer obtained above and a second separator were laminated to this peeled surface in the order given. The same separators as those of Example 1 were used as the first separator and the second separator, respectively. In this way, a laminate B having a structure of first separator (75 μm)/pressure-sensitive adhesive layer (23 μm) /polarizing plate (100 μm) /impact-absorbing pressure-sensitive adhesive layer (250 μm)/second separator (75 μm) was produced.

The laminate B obtained above was irradiated with laser light from CO$_2$ laser, and the second separator, the impact-absorbing pressure-sensitive adhesive layer, the polarizing plate, and the pressure-sensitive adhesive layer were cut (half cut), to thereby produce the impact-absorbing pressure-sensitive adhesive sheet as shown in FIG. 2B. Dimensions of the obtained impact-absorbing pressure-sensitive adhesive piece were 40 mm in length×30 mm in width. Cutting by laser light was conducted under the conditions of: an output of 75 W; a transfer rate of 400 mm/second; a focus of 66 mm; and the number of irradiation of once.

Example 7

The substrate ("PET SEPA MRN") on one side of the impact-absorbing layer obtained above was peeled off, and the undercoat layer obtained above, a support layer, the undercoat layer obtained above, and a separator (substrate) were laminated to this peeled surface in the order given. Next, the substrate ("PET SEPA MRF") on another side of the impact-absorbing layer was peeled off, and the undercoat layer obtained above and a polarizing plate (trade name, TEG1465DUHC, available from Nitto Denko Corporation) were laminated to this peeled surface in the order given. A PET film (trade name "MDAR", available from Toyo Metallizing Co., Ltd.) having a thickness of 75 μm was used as the separator. A film exerting substantial optical isotropic property (thickness of 60 μm, dynamic storage modulus G' of $2×10^9$ Pa, Δnd[590]=5 nm, Rth[590]=7 nm, trade name: Zeonor ZF-14, available from Zeon Corporation) was used as the support layer. In this way, a laminate C having a structure of separator (75 μm)/pressure-sensitive adhesive layer (23 μm)/support layer (60 μm)/impact-absorbing pressure-sensitive adhesive layer (250 μm)/polarizing plate (100 μm) was produced.

The laminate C obtained above was irradiated with laser light from $CO_2$ laser, and the laminate C was cut (full cut), to thereby produce the impact-absorbing pressure-sensitive adhesive sheet as shown in FIG. 1C. Dimensions of an impact-absorbing pressure-sensitive layer of the impact-absorbing pressure-sensitive adhesive sheet were 40 mm in length×30 mm in width. Cutting by laser light was conducted under the conditions of: an output of 100 W; a transfer rate of 400 mm/second; a focus of 66 mm; and the number of irradiation of once.

Comparative Example 1

An impact-absorbing pressure-sensitive adhesive sheet was produced in the same manner as in Example 1 except that: laser light was irradiated by using UV laser (trade name "5330", manufactured by Electro Scientific Industries, Inc.); the output was changed to 20 W; and the transfer rate was changed to 2 mm/second.

Comparative Example 2

An impact-absorbing pressure-sensitive adhesive sheet was produced in the same manner as in Example 1 except that cutting was conducted by using a continuous automatic cutting machine (Super cutter, a tip angle of 45°, double edge).

Comparative Example 3

An impact-absorbing pressure-sensitive adhesive sheet was produced in the same manner as in Example 1 except that cutting was conducted by a water jet method. Note that the cutting conditions were: a water extrusion pressure of 350 MPa; a tip diameter (water extrusion diameter) of Φ0.1 mm, and a transfer rate of 2 mm/second.

Table 1 collectively shows the impact-absorbing pressure-sensitive adhesive sheets obtained in Examples and Comparative Examples. Note that the obtained impact-absorbing pressure-sensitive adhesive sheets were evaluated by the following method.

1. Measurement of Taper Angle
For Examples 1 to 5
The taper angle was calculated from a value obtained by measuring an extended width (L6 in FIG. 2A) of the impact-absorbing pressure-sensitive adhesive piece from the second separator and a total (325 μm) of the thickness of the impact-absorbing pressure-sensitive adhesive piece and the thickness of the second separator.
For Example 6
The taper angle was calculated from a value obtained by measuring an extended width (L7 in FIG. 2B) of the pressure-sensitive adhesive layer from the second separator and a total (448 μm) of the thickness of the pressure-sensitive adhesive layer, the thickness of polarizing plate, the thickness of the impact-absorbing pressure-sensitive adhesive piece, and the thickness of the second separator.
For Example 7
The taper angle was calculated from a value obtained by measuring an extended width (L8 in FIG. 1C) of the separator from the polarizing plate and a total (508 μm) of the thickness of the separator, the thickness of the pressure-sensitive adhesive layer, the thickness of the support layer, the thickness of the impact-absorbing pressure-sensitive adhesive piece, and the thickness of the polarizing plate.

2. Evaluation of Cut Surface
The cut surface (side surface) of the impact-absorbing pressure-sensitive adhesive layer (impact-absorbing pressure-sensitive adhesive piece) was observed with a microscope.
Evaluation Results
○: Smooth
x: Wavy, uneven, etc.

3. Re-Adhesion
Whether the adjacent impact-absorbing pressure-sensitive adhesive layers (impact-absorbing pressure-sensitive adhesive pieces) re-adhered during or after cutting was observed.
Evaluation Results
○: No re-adhesion observed
x: Re-adhesion observed 4. Evaluation of Releasability
The separator (substrate) was peeled off from each of ten impact-absorbing pressure-sensitive adhesive sheet or impact-absorbing pressure-sensitive adhesive pieces obtained. During peeling, ease of peeling, and the presence or absence of adhesive defects (partial attaching of the impact-absorbing pressure-sensitive adhesive layer (impact-absorbing pressure-sensitive adhesive piece) to the separator) were evaluated.
Evaluation Results
○: Excellent releasability
x: Poor releasability

TABLE 1

|  | L6 (L7, L8) (μm) | Thickness (μm) | Taper angle (°) | L2 (μm) | L5 (μm) | L3 (L4) (μm) | Cut surface | Readhesion | Releasability ○ | Releasability x | Productivity (Chips/h) |
|---|---|---|---|---|---|---|---|---|---|---|---|
| Example 1 | 40 | 325 | 83 | 80 | — | 160 | ○ | ○ | 10 | 0 | 9000 |
| Example 2 | 60 | 325 | 80 | 40 | — | 160 | ○ | ○ | 10 | 0 | 9000 |
| Example 3 | 80 | 325 | 76 | 30 | — | 190 | ○ | ○ | 10 | 0 | 4500 |
| Example 4 | 100 | 325 | 73 | 30 | — | 230 | ○ | ○ | 6 | 4 | 4500 |

TABLE 1-continued

| | L6 (L7, L8) (μm) | Thickness (μm) | Taper angle (°) | L2 (μm) | L5 (μm) | L3 (L4) (μm) | Cut surface | Readhesion | Releasability o | Releasability x | Productivity (Chips/h) |
|---|---|---|---|---|---|---|---|---|---|---|---|
| Example 5 | 140 | 325 | 67 | 30 | — | 310 | o | o | 9 | 1 | 4500 |
| Example 6 | 60 | 448 | 83 | 45 | 40 | 160 | o | o | 10 | 0 | 9000 |
| Example 7 | 70 | 508 | 82 | — | — | — | o | o | 10 | 0 | 9000 |
| Comparative example 1 | — | 325 | — | — | — | 70 | Δ | Δ | 5 | 5 | 45 |
| Comparative example 2 | — | 325 | 90 | — | — | 0 | x | x | — | — | 8000 |
| Comparative example 3 | — | 325 | — | — | — | — | x | x | — | — | 350 |

Table 1 reveals that the impact-absorbing pressure-sensitive adhesive sheets of Examples 1 to 7 each had a taper angle of 65° or more and excellent yield. Further, the impact-absorbing pressure-sensitive adhesive sheets each had a smooth cut surface with a tapered surface. Meanwhile, the impact-absorbing pressure-sensitive adhesive sheet of Comparative Example 1 had nearly smooth surface. However, the side surface lower ends of the adjacent impact-absorbing pressure-sensitive adhesive pieces re-adhered, and no tapered surface was formed. Thus, no taper angle was measured. The impact-absorbing pressure-sensitive adhesive sheet of Comparative Example 2 had a taper angle of substantially 90°, but the adjacent impact-absorbing pressure-sensitive adhesive pieces re-adhered. In Comparative Example 3, no half cut (cutting of the second separator and the impact-absorbing pressure-sensitive adhesive layer only) was realized, which resulted in full cut (cutting of the first separator as well). Further, the cut surfaces re-adhered, and thus no taper angle was measured. In the impact-absorbing pressure-sensitive adhesive sheets of Comparative Examples 2 and 3, the cut surfaces re-adhered, and no tapered surface was formed.

The impact-absorbing pressure-sensitive adhesive sheets of Examples 1 to 3 and Examples 6 and 7 each had excellent releasability. In the impact-absorbing pressure-sensitive adhesive sheet of each of Examples 4 and 5 having a relatively small taper angle, the impact-absorbing pressure-sensitive adhesive piece and the second separator in some of the sheets were integrated and were not peeled, and the second separator alone was peeled off. Comparative Example 1 involved re-adhesion as described above. Thus, peeling involved difficulties, and adhesive defects were caused. Releasability was poor. In Comparative Examples 2 and 3, re-adhesion of the cut surfaces was extensive and no releasability was evaluated. Note that the impact-absorbing pressure-sensitive adhesive sheets of examples excluding Comparative Examples 1 and 3 each had excellent productivity. In particular, the impact-absorbing pressure-sensitive adhesive sheets of Examples 1 and 2 and Examples 6 and 7 each had excellent productivity.

The impact-absorbing pressure-sensitive adhesive piece obtained in each of Example 1 and Comparative Example 1 was used in an image display part of a cell phone. As a result, the impact-absorbing pressure-sensitive adhesive piece of Example 1 provided excellent viewing properties than those of Comparative Example 1.

The impact-absorbing pressure-sensitive adhesive sheet of the present invention may suitably be used for an image display apparatus such as a liquid crystal display apparatus.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. An impact-absorbing pressure-sensitive adhesive sheet comprising:
   a separator; and
   an impact-absorbing pressure-sensitive adhesive layer including an impact-absorbing layer and provided on one side of the separator, wherein:
   the separator is releasable from the impact-absorbing pressure-sensitive adhesive layer,
   the separator has an exposed side edge or side surface which extends in a direction along an edge of a side surface of the impact-absorbing pressure-sensitive adhesive layer;
   the side surface of the entire impact-absorbing pressure-sensitive adhesive layer includes a tapered surface; and
   the tapered surface has a taper angle of 65° or more.

2. An impact-absorbing pressure-sensitive adhesive sheet according to claim 1, wherein the impact-absorbing layer has a thickness of 100 to 1,000 μm.

3. An impact-absorbing pressure-sensitive adhesive sheet according to claim 1, wherein the impact-absorbing layer has a dynamic storage modulus G' of $1 \times 10^7$ Pa or less at 20° C.

4. An impact-absorbing pressure-sensitive adhesive sheet comprising:
   a separator; and
   a plurality of impact-absorbing pressure-sensitive adhesive pieces each including an impact-absorbing layer and provided at certain intervals on one side of the separator, wherein:
   a side surface of each of the entire impact-absorbing pressure-sensitive adhesive pieces includes a tapered surface; and
   the tapered surface has a taper angle of 65° or more wherein the impact-absorbing layer has a thickness of 10 to 1,000 μm.

5. An impact-absorbing pressure-sensitive adhesive sheet according to claim 4, wherein:
   the plurality of impact-absorbing pressure-sensitive adhesive pieces are provided at certain intervals on one side of the separator; and
   a distance between side surface lower ends of the adjacent impact-absorbing pressure-sensitive adhesive pieces is 30 μm or more.

6. An impact-absorbing pressure-sensitive adhesive sheet according to claim 4, wherein the impact-absorbing layer has a dynamic storage modulus G' of $1 \times 10^7$ Pa or less at 20° C.

7. An impact-absorbing pressure-sensitive adhesive sheet, wherein the impact-absorbing pressure-sensitive adhesive sheet is obtained by thoroughly cutting a laminate comprising a separator and an impact-absorbing pressure-sensitive adhesive layer including an impact-absorbing layer and provided on one side of the separator, whereby the impact-absorbing pressure-sensitive adhesive layer has a thoroughly-cut side end surface, the thoroughly-cut side end surface of the entire impact-absorbing pressure-sensitive adhesive layer is a tapered surface; and the tapered surface has a taper angle of 65° or more.

* * * * *